United States Patent
Ngo et al.

(10) Patent No.: US 6,611,518 B1
(45) Date of Patent: Aug. 26, 2003

(54) METHODS AND APPARATUS FOR FLEXIBLE DEVICE INTERFACE PORT ASSIGNMENT IN A DATA COMMUNICATIONS SWITCHING SYSTEM

(75) Inventors: Gordon K. Ngo, Plano, TX (US); Se Hyeon Rhee, Seoul (KR); Senthil Kumar Viswanathan, Richardson, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/156,248

(22) Filed: Sep. 18, 1998

(51) Int. Cl.[7] .................. H04Q 11/00; H04L 12/28; H04J 3/16
(52) U.S. Cl. .............. 370/386; 370/375.1; 370/465
(58) Field of Search .................. 370/367, 395.1, 370/396, 398, 395.2, 395.3, 395.5, 412, 413, 414, 417, 465, 386, 387, 388, 385; 340/2.27, 2.28, 2.21; 379/219, 271, 291, 335

(56) References Cited

U.S. PATENT DOCUMENTS

| | | | | |
|---|---|---|---|---|
| 5,724,352 A | * | 3/1998 | Cloonan et al. | 370/395.1 |
| 5,856,977 A | * | 1/1999 | Yang et al. | 370/413 |
| 5,875,177 A | * | 2/1999 | Uriu et al. | 370/248 |
| 5,982,771 A | * | 11/1999 | Caldara et al. | 370/413 |
| 6,046,999 A | * | 4/2000 | Miki et al. | 370/395.52 |
| 6,094,433 A | * | 7/2000 | Kunimoto et al. | 370/397 |
| 6,185,222 B1 | * | 2/2001 | Hughes | 370/414 |

* cited by examiner

*Primary Examiner*—Chau Nguyen
*Assistant Examiner*—Andy Lee

(57) ABSTRACT

Methods and apparatus are provided for use in an ATM network that allow several devices to access a limited number of device interface ports in a ATM switch fabric, by providing flexible assignment of the limited ports. The methods and apparatus are dynamically configurable to permit port assignments to be changed on the fly, without interfering with existing communications. In certain embodiments a programmable M×N cross point switch is provided between M number of devices and a N×N ATM switch matrix. The cross point switch allows two or more devices to switchably access one or more of the device interface ports in the ATM switch matrix. The assignment of devices to device interface ports can be initiated manually or automatically by local and/or external control processes/devices.

20 Claims, 3 Drawing Sheets

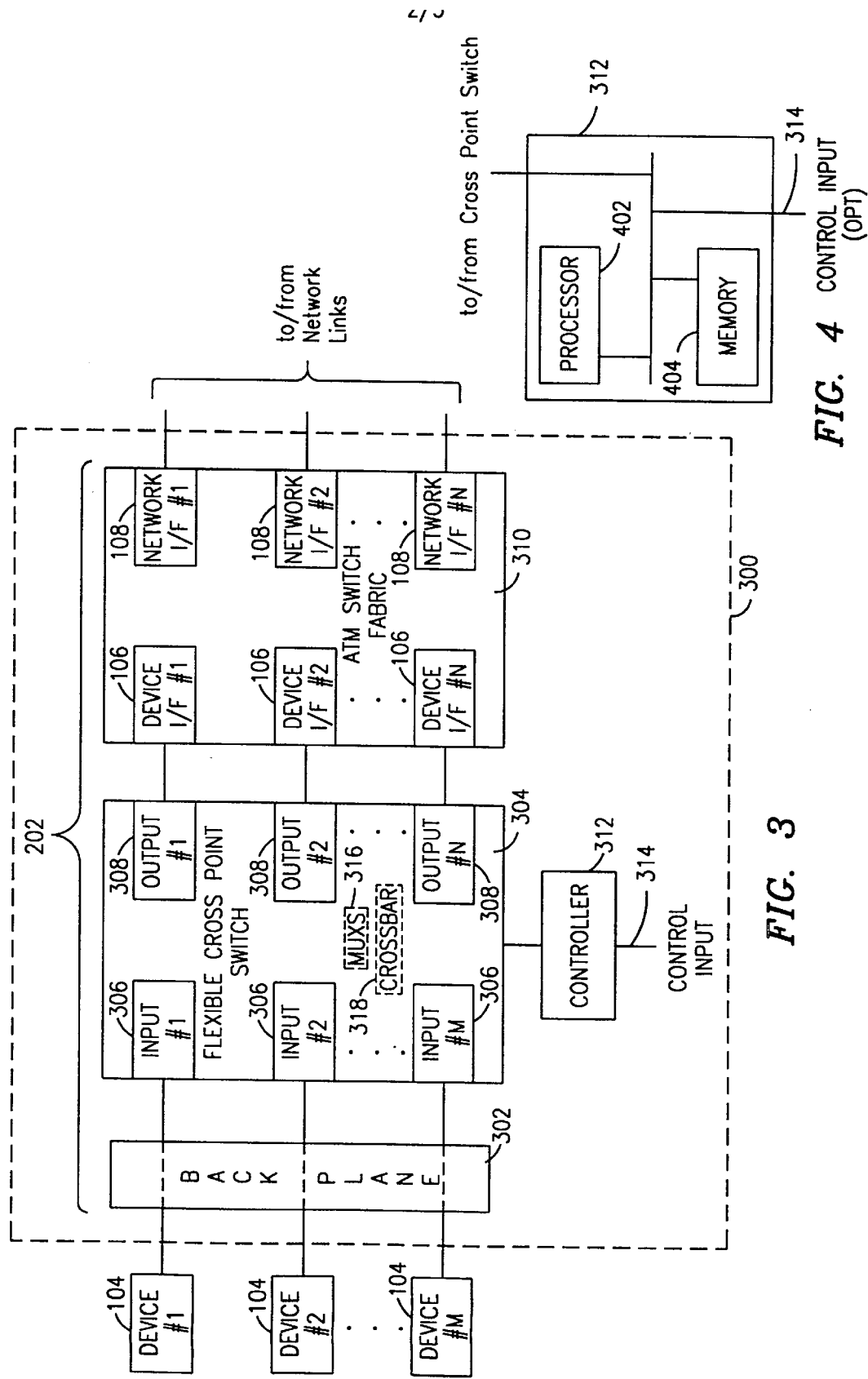

METHODS AND APPARATUS FOR FLEXIBLE DEVICE INTERFACE PORT ASSIGNMENT IN A DATA COMMUNICATIONS SWITCHING SYSTEM

FIELD OF THE INVENTION

The present invention relates to data communications, and more particularly, to methods and apparatus for connecting a plurality of devices to a data communications network through a switching system.

BACKGROUND OF THE INVENTION

Asynchronous Transfer Mode (ATM) is becoming an important standard for communications around the world. One reason for this is that ATM is essentially the only established standards based technology that has been designed from the beginning to accommodate the simultaneous transmission of data, voice and video. ATM is essentially a connection-oriented, switched based technology that provides dedicated bandwidth for each connection, a higher aggregate bandwidth, well defined connection procedures, and flexible access speeds ranging from Megabit to Gigabit speeds.

An ATM network basically consists of several ATM switches that are interconnected by various communication links. A typical ATM switch includes a programmable switch matrix or switch fabric that supports the interconnectivity for both local devices and other remote ATM switches and devices. The flexibility of the switch fabric allows for virtual circuits to be established between nodes using switching protocols and commands. Depending upon the type of transfer, these virtual circuits provide point-to-point connections that can be unidirectional or bidirectional. In this manner, an ATM network is essentially woven using the switch fabric provided by the various ATM switches.

FIG. 1 is a block diagram depicting a typical ATM network 100 having an ATM switch 102 that provides network connectivity for several devices 104, for example, numbered 1 through N. Devices 104 can include computers, hosts, routers, gateways, peripherals, appliances, and other like devices that are configured to send and/or receive the type of information (e.g., data, voice, video) carried by ATM network 100.

As shown, devices 104 are each connected to a dedicated device interface port 106 (numbed 1 through N) within ATM switch 102. On the network side of ATM switch 102, there are several network interface ports 108 (also, numbered 1 through N). ATM switch 102 provides the switch fabric that selectively connects together (and later disconnects) specified device interface ports and/or network interface ports to help establish a virtual circuit though ATM network 100. For example, in FIG. 1, a virtual circuit is depicted by the solid and dashed lines connecting device (#2) 104 to remote device 110, through ATM switch 102 and network links 112. Network links 112 typically includes one or more communication media, such as, for example, terrestrial and/or satellite communication lines/services.

As further depicted in FIG. 1, ATM switch 102 is limited in the number of devices 104 that can be supported by the "N" number of device interface ports 106 and the size of the switch fabric (i.e., N×N). For example, certain ATM switches provide a 16×16 switch fabric (i.e., where N=16) having sixteen device interface ports 106 and sixteen network interface ports 108. As such, these ATM switches are limited to supporting sixteen devices 104. Larger ATM switches are available, for example, 32×32 switch fabrics are provided by certain manufacturers. These 32×32 and even larger ATM switches, however, tend to be very complex and expensive.

As can be appreciated, the fixed size and high cost of an ATM switch, can be problematic for users that want to "phase-in" an ATM network and/or provide for future expansion of the ATM network, for example, by adding additional devices to the ATM switch. Indeed, users, such as small businesses, that have limited communication funds may be forced to forego the development of an ATM network until such time as they can justify the purchase of a larger ATM switch. Other users may be forced to purchase too large an ATM switch. In a worse case scenario, the large ATM switch that is purchased exceeds their current demands, but will eventually lack the capacity to support their future growth and additional demands. Thus, there is a need for methods and apparatus that provide a more flexible and cost-effective ATM switching capability.

SUMMARY OF THE INVENTION

The methods and apparatus of the present invention provide a more flexible and cost-effective switching capability by allowing device interface ports within a switch fabric to be dynamically assigned in a manner that allows several devices to selectively access a single device interface port.

Thus, for example, assume that a user has a current need to provide connectivity for twelve devices. Assume also that the user plans to expand that need to twentyeight devices in the future. In the past, such a user might decide to incrementally purchase two 16×16 switches, or initially purchase one larger 32×32 switch. Both of these choices tend to be rather expensive and wasteful. Given the present invention, however, such a user can purchase one 16×16 switch, for example, and economically add configurable connections that allow up to about forty-eight devices to access the network through the 16×16 switch.

With this example in mind, in accordance with certain aspects of the present invention, flexible network connectivity is provided to a plurality of devices through a network interface that can be dynamically configured and reconfigured as needed, without interrupting existing network connections, to meet the current communication needs of the user.

In accordance with other aspects of the present invention, the various methods and apparatus provided allow a data communication system to exceed the network connectivity capabilities of a conventional network switch.

In accordance with still other aspects of the present invention, the various methods and apparatus provided allow for incremental growth of a system to more cost-effectively meet the users communication needs.

In accordance with further aspects of the present invention, the various methods and apparatus provide a lower cost solution to connecting a plurality of devices to a network through a limited number of communication paths.

In accordance with still further aspects of the present invention, the various methods and apparatus provided tend to reduce the complexity of a network switch by significantly reducing the size of the switch fabric therein, for example.

In accordance with additional aspects of the present invention, the various methods and apparatus provide enhanced configuration capabilities that can be used to automatically test various switch and network configurations and connections.

By way of example, the above stated needs and others are met by an apparatus for selectively connecting a plurality of external devices to a network, in accordance with certain embodiments of the present invention. The apparatus includes a selector and a switch. The selector has a plurality of input ports and a plurality of output ports. In certain preferred embodiments, the number of input ports within the selector is greater than the number of output ports within the selector, for example, certain selectors have at least about forty-eight input ports and at least about sixteen output ports.

While each of the input ports is configured to be connected to a different external device, the selector is dynamically configurable to selectively couple at least one of the input ports to at least one of the output ports. Thus, for example, at least one of the forty-eight input ports, or a subset thereof, can be selectively coupled to at least one of the sixteen output ports, or a subset thereof. This allows several devices to gain access to the network, without requiring a dedicated device interface port within the switch for each of the devices.

The switch has a plurality of device interface ports, for example "N" number, each of which is coupled to a corresponding output port in the selector. The switch is configured to switchably connect an individual device interface port to an identified network interface port, and thereby connect a particular device to the network through the identified network interface port.

In accordance with still other embodiments of the present invention, the selector is configured to be responsive to commands that are received through one of the input ports or output ports or through a separate control input. The commands cause the selector to be dynamically configured or reconfigured. For example, the selector can include a controller that is operatively configured to respond to the commands and dynamically reconfigure the selector such that a specified input port is connected or otherwise assigned to a specified output port. Additionally, the selector can also be configured to selectively couple at least one of the input ports to at least another one of the input ports, and/or at least one of the output ports to at least another one of the output ports. In this manner, enhanced loop-back types of diagnostic testing/evaluation, or even non-conventional connections or virtual circuits, can be realized.

In accordance with other embodiments of the present invention, a method is provided for connecting at least one external device to a network. The method includes the steps of connecting the external device to an input port of a selector, dynamically configuring the selector to selectively connect the input port to an output port within the selector, and connecting the output port to a device port in a switch. The method further includes the step of causing the switch to connect the device port to a network.

BRIEF DESCRIPTION OF THE DRAWINGS

A more complete understanding of the present invention may be had by reference to the following Detailed Description and appended claims when taken in conjunction with the accompanying Drawings wherein:

FIG. 3 is a block diagram depicting a flexible ATM switch, as in FIG. 2, for example, having a cross point switch that can be dynamically configured to selectively connect an Mth device to an Nth device interface port, in accordance with certain embodiments of the present invention;

FIG. 4 is a block diagram depicting a controller for use within a flexible ATM switch, as depicted in FIG. 3, for example, in accordance with certain embodiments of the present invention.

DETAILED DESCRIPTION

While the following exemplary embodiments are described with respect to an ATM network and associated devices, it is to be understood that the methods and apparatus of the present invention can be applied to other types of networks and devices.

Figure 1:
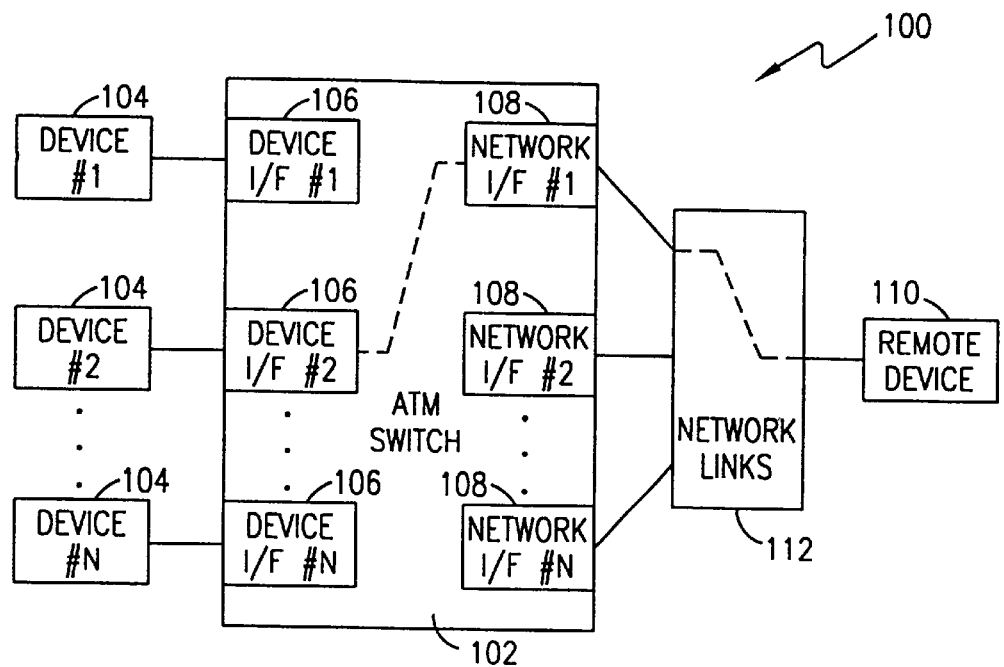
FIG. 1 is a block diagram depicting a network having a conventional ATM switch that is capable of supporting N number of devices using N number of device interface ports.
Figure 2:
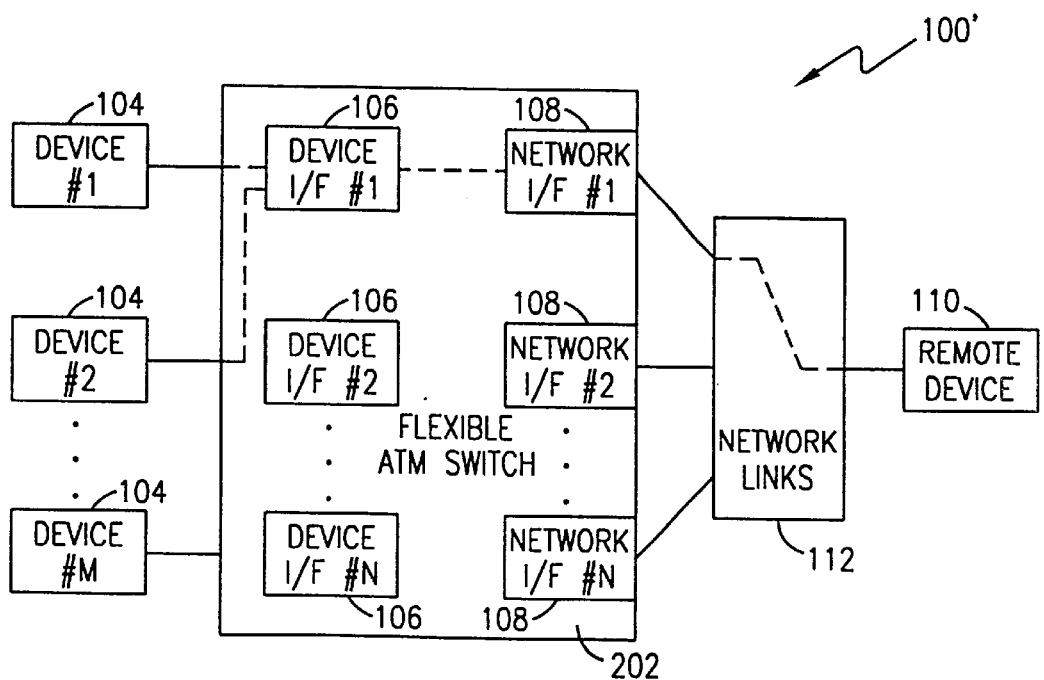
FIG. 2 is a block diagram depicting a network having a flexible ATM switch that is capable of supporting M number of devices using N number of device interface ports, wherein M>N, in accordance with certain embodiments of the present invention.

With this in mind, FIG. 2 is a block diagram depicting an ATM network 100' having a flexible ATM switch 202, in accordance with certain embodiments of the present invention. Although similar to ATM network 100 as depicted in FIG. 1, ATM network 100' has the capability to provide connectivity to an increased number, (i.e., M) of devices 104 using flexible ATM switch 202.

As described in greater detail below, flexible ATM switch 202 is dynamically configurable, for example, to selectively connect/disconnect specific devices 104 to/from a specific device interface port 106 in the ATM switch fabric. Thus, flexible ATM switch 202 can be configured and reconfigured on the fly, for example, based on commands from one or more controlling programs running on a local host and/or external host processor. In this manner, devices 104 are dynamically assigned to access the network through a specific device interface port 106.

The ability to reconfigure the connections between devices 104 and flexible ATM switch 202 allows several devices to share one or more device interface ports. By way of example, device 104 (#1) and device 104 (#2) can be configured to selectively share device interface port (#1) 106. Thus, depending upon the current configuration of flexible ATM switch 202, either device (#1) or device (#2) would be connected to device interface port (#1) and thereby to ATM network 100'.

FIG. 3 is a block diagram depicting an exemplary component chassis 300 having a flexible ATM switch 202 arranged therein, in accordance with certain embodiments of the present invention. As shown, flexible ATM switch 202 includes a backplane 302, a cross point switch 304, a switch fabric 310, and a controller 312. Backplane 302 provides a termination point for connecting devices 104 to flexible ATM switch 202. Backplane 302 passes various signals between cross point switch 304 and devices 104, preferably without significantly altering the signals.

In certain preferred embodiments, backplane 302 incorporates conventional connector terminals as required by devices 104. The connections that pass signals between these connector terminals and cross point switch 304 are specifically manufactured to substantially rigid requirements to control/match the impedance and/or resulting signal delays. For example, in certain embodiments, backplane 302 is configured to carry about 480 different electrical signals (for M=48 different devices 104) through conductive traces, each of which is substantially the same length, (e.g., 12±0.25 inches).

Cross point switch 304 includes input ports 306 and output ports 308. The naming convention used for input ports 306 and output ports 308 is not meant to restrict or otherwise classify the types of signals or connections provided by the respective ports. Instead, the naming convention, (i.e., "input" and "output") are employed simply to specify their illustrated location with respect to devices 104. Thus, input ports 306 and output ports 308 can include unidirectional (either input or output) and/or bidirectional connections.

As depicted, an individual input port 306 is provided for each of the devices 104 that is to be supported by flexible ATM switch 202. Thus, for example, in certain exemplary embodiments forty-eight input ports 306 are provided in cross point switch 304 to support up to about forty-eight different devices 104. Of course, the number of devices and input ports 306 can vary depending upon the desired arrangement, (i.e., M>1).

Cross point switch 304 is configured to selectively connect/disconnect an individual input port 306 to/from an individual output port 308. In this manner, for example, a given device 104 can be coupled to, or otherwise assigned, a specific output port 308, through backplane 302 and a dedicated input port 306. As shown, each of the output ports 308 is further connected to a corresponding device interface port 106 in switch fabric 310.

One important feature of cross point switch 304 is that two or more devices 104 can be made to selectively access one or more of the device interface ports 106 in switch fabric 310, as determined by the configuration of cross point switch 304. Thus, it is preferred that the number (M) of input ports 306 be greater than the number (N) of output ports 308. For example, in certain exemplary embodiments, cross point switch 304 includes forty-eight input ports 306 and sixteen output ports 308 (i.e., M=48, N=16). Thus, using this 48×16 (M×N) cross point switch 304, up to about forty-eight different devices 104 can be selectively supported by a switch fabric 310 having only sixteen device interface ports 106 and sixteen network interface ports 108.

Of course, in this example, not all of the forty-eight devices can be connected to the network at the same time, because there are only sixteen network interface ports 106 provided, hence the term "selectively" connected. For many network arrangements, wherein devices 104 may sit idle for extended periods of time before requiring access to the network, being selectively connected/disconnected to/from one or more device interface ports 106 does not appear to significantly impact on the performance of the network arrangement and/or device. This is especially true given the speed associated with the dynamic reconfiguration capability of certain preferred cross point switches.

It is further recognized, that larger arrangements, or conversely, smaller arrangements, can benefit under the present invention. For example, a 48×32 cross point switch 304 can be used along with a larger 32×32 switch fabric to provide additional connectively, (i.e., up to thirty two devices 104 can be connected to the network at the same time). Thus, larger (or smaller) cross point and/or multiple cross point switches can be employed as required.

As shown in FIG. 3, each of the output ports 308 is connected to a corresponding device interface port 106 within switch fabric 310. Switch fabric 310 is configured to switchably connect/disconnect device interface ports 106 with network interface ports 108. Switch fabric 310 is responsive to ATM protocol based commands in building connections, or tearing down existing connections, between a specified device interface port 106 and a specified network interface port 108. In this manner, for example, switch fabric 310 completes the connection between a device 104 and remote device 110 (see FIG. 2). As such, in accordance with certain embodiments of the present invention, switch fabric 310 is a conventional (N×N) switch fabric or matrix, as found in many of the ATM switches available today.

Controller 312 is configured to control the connection/disconnection functions provided by cross point switch 304. More particularly, controller 312 monitors the status of cross point switch 304 and is responsive to commands received from one or more external control processes in configuring and reconfiguring the connections provided by cross point switch 304.

Thus, for example, a controller 312 is depicted in the block diagram of FIG. 4, in accordance with certain preferred embodiments of the present invention. Controller 312 includes a processor 402, memory 404, and associated software (not depicted). Processor 402 is responsive to commands received, for example, over one of the input ports 306, output ports 308, and/or a separate control input 314. Software instructions are provided to processor 402 that cause processor 402 to build and/or maintain a database that includes a configuration map associated with cross point switch 304.

The configuration map, which can be stored within memory 404, for example, includes a port configuration for each of the input ports 306 and output ports 308, (e.g., device number, type, pin assignments, etc.) and the current connections between input ports 306 and output ports 308.

Controller 312, based on the configuration map, the commands received, and/or the current status of cross point switch 304, provides one or more controlling signals to cross point switch 304 that cause certain connections to be made and/or broken. By way of example, controller 312 can output a JTAG or similar bit stream to cross point switch 304 that causes input port (#1) 306 to be disconnected from output port (#1) 308, and reconnected to output port (#2) 308. Once this reconfiguration has been accomplished, the configuration map is updated to reflect the changes.

It is preferred that cross point switch 304 be dynamically reconfigurable such that individual changes can be made without disrupting the communications on other established connections. Thus, in the reconfiguration example above, when input port (#1) 306 is disconnected from output port (#1) 308 and reconnected to output port (#2) 308, an existing connection between input port (#2) 306 and output port (#N) 308 is not disrupted.

With the addition of cross point switch 304, flexible ATM switch 202 is further capable of providing enhanced loop-back connections. For example, in certain embodiments, cross point switch 304 can connect an input port 306 to another input port 306. Similarly; cross point switch 304 can connect an output port 308 with another output port 308. These types of loop-back connections can be of particular use when testing switching, network connectivity, and/or various components/devices. Thus, for example, in addition to providing controls to controller 312, a network manager process running on remote device 110 can also check on the operation of the network and/or switch fabric 310 using a loop-back connection between output port (#1) 308 and output port. (#2). In another example, a local system management function can check the various device/backplane connections and/or the operation of cross point switch 304 by using a loop-back connection between input port (#1) 306 and input port (#2) 306.

Those skilled in the art will recognize that these and other functions can be provided within flexible ATM switch 202, and in particular within cross point switch 304, using conventional controlled, high-speed switching techniques/circuits. For example, in accordance with certain embodiments of the present invention, cross point switch 304 includes a plurality of multiplexers (MUXs) 316 connected between input ports 306 and output ports 308, such that one or more signals from an individual input port 306 can be connected to a specified output port 308, based on a control signal(s) from controller 312.

By way of a further example, in accordance with still other embodiments of the present invention, cross point switch 304 includes at least one crossbar switch or circuit. 318 that is connected between input ports 306 and output ports 308, such that one or more signals from an individual input port 306 can be connected to a specified output port 308, again, based on a control signal from controller 312.

It is further recognized that certain embodiments of flexible ATM switch 202 can include several cross point switches 304 that are configured to service specific input ports 306 and specific output ports 308. Thus, in accordance with certain preferred embodiments of the present invention, flexible ATM switch 202 can have several cross point switches 304 that are arranged to support a specific subset of the devices 104. Furthermore, a plurality of controllers 312 can also be employed to control the different cross point switches.

Figure 5:
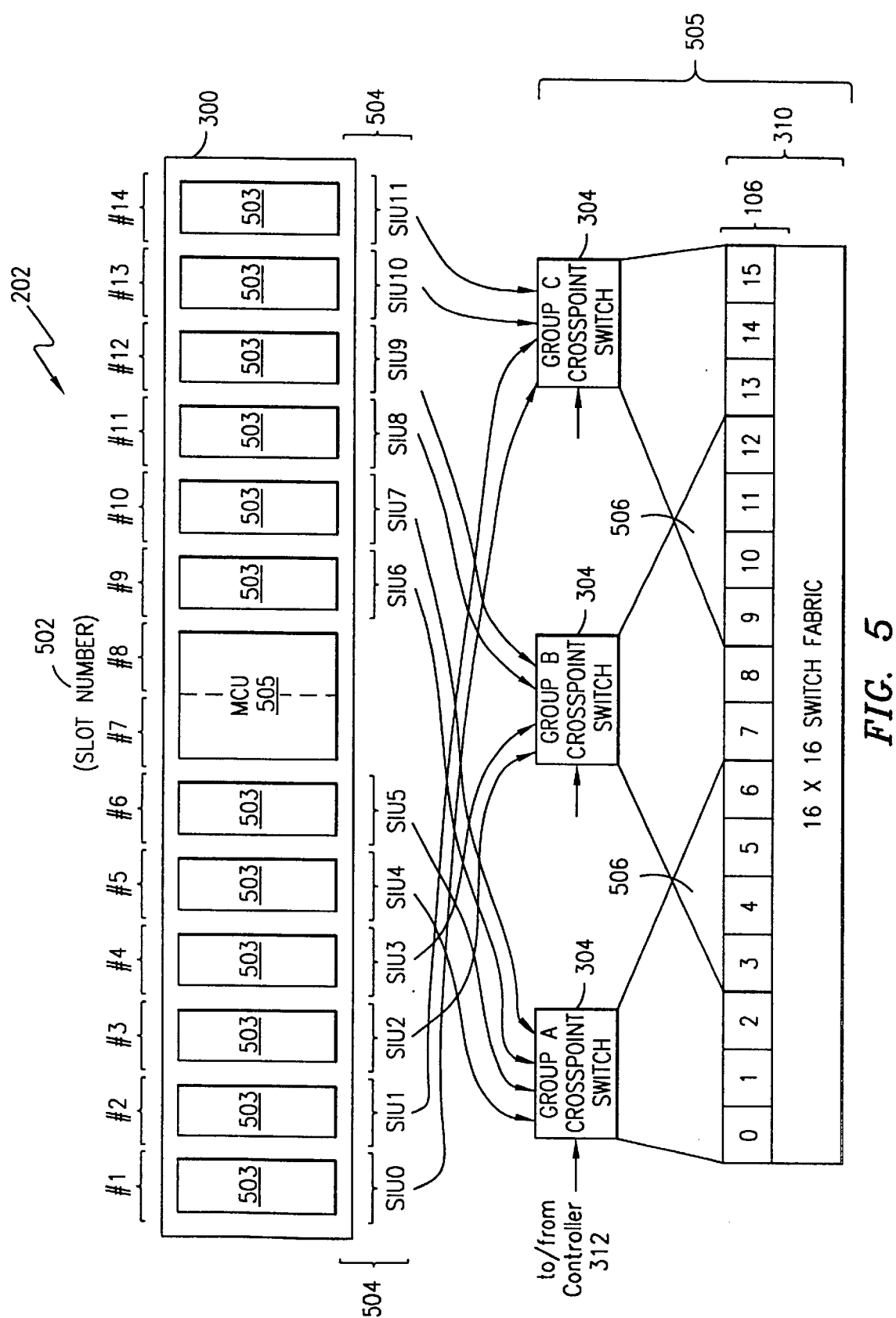
FIG. 5 is a system diagram of an exemplary flexible ATM switch and the physical and/or functional relationship between a plurality of cross point switches, a backplane and the device interface ports of an ATM switch fabric, in accordance with certain embodiments of the present invention.

FIG. 5 is a system diagram of an exemplary flexible ATM switch 202 that depicts the physical and functional relationship between a plurality of cross point switches 304, a backplane 302 and the device interface ports 106 of an ATM switch fabric 310, in accordance with certain preferred embodiments of the present invention. In this exemplary embodiment, M=48 and N=16.

As shown, within chassis 300 there are a plurality of standard plug-in card slots 502, numbered one through fourteen. Twelve of the slots 502, i.e, those numbered one through six and nine through fourteen, are each configured with a line interface card 503. Each line interface card 503 provides interface support for up to four different devices 104 through dedicated ports in backplane 302. Two of the slots 502, i.e, those numbered seven and eight, are configured to support a main control unit (MCU) 505 having a plurality of cross point switches 304, at least one controller 312, and a N×N switch fabric 310.

As further depicted, each of the line interface cards 503 is assigned to a subscriber interface unit (SIU) 504, for example, numbered zero through eleven. In this manner, forty-eight different devices 104 can be supported, i.e, up to four devices 104 being supported through each SIU 504.

In accordance with certain preferred embodiments of the present invention, groups of SIUs 504, and therefore groups of devices 104, are assigned to one or more of the plurality of cross point switches 304. For example, as shown in FIG. 5, the SIUs 504 can be divided into three groups, namely groups A, B and C. Group A includes four SIUs 404, numbered four, five, six, and seven. Group B includes four SIUs 504, numbered two, three, eight, and nine. Group C includes the remaining four SIUs 504, numbered zero, one, ten, and eleven.

In this exemplary embodiment, there are at least three cross point switches 304 provided, one for each of the groups A, B and C. The output ports for each cross point switch 304 are connected to corresponding device interface ports 106 in the switch fabric 310.

Thus, for example, the cross point switch 304 that supports group A has up to sixteen input ports and seven output ports. The seven "group A" output ports are connected to seven corresponding device interface ports 106, i.e., numbered zero through six in FIG. 5. The cross point switch 304 that supports group B, for example, has up to sixteen input ports and ten output ports. The ten "group B" output ports are connected to ten corresponding device interface ports 106, i.e., numbered three through twelve in FIG. 5. Similarly, the cross point switch 304 that supports group C, for example, has up to sixteen input ports and seven output ports. The seven "group C" output ports are connected to seven corresponding device interface ports 106, i.e., numbered nine through fifteen in FIG. 5.

As described above and graphically depicted by the overlapping regions 506 in FIG. 5, in this exemplary embodiment many of the device interface ports 106 within switch fabric 310 are connected to output ports from at least two of the plurality of cross point switches 304. These device interface ports 310 are, therefore, essentially "shared" between groups.

Thus, for example, referring to FIG. 5, the device interface ports 106, numbered three through six are each shared by the "group A" output ports and the "group B" output ports. Likewise, the device interface ports 106, numbered nine through twelve are each shared by the "group B" output ports and the "group C" output ports.

The use of these shared device interface ports is selectably controlled by controller 312, (e.g., see FIGS. 3 and 4). As such, no more than one of the cross point switches 304 is allowed to operatively use a shared device interface port 106 at a given time.

One of the functional advantages to grouping devices 104 and/or sharing device interface ports 106 between two or more cross point switches 304, is that certain devices 104 can be provided with different levels of service. By way of example, the devices in group B may have a higher probability of accessing the network than the devices in groups A or C, because the cross point switch 304 that supports the group B devices has access to more device interface ports 106 within switch fabric 310.

Although certain embodiments in accordance with the present invention, are depicted in the accompanying Drawings and described in the foregoing text, it should be understood that the invention is not limited to the embodiments disclosed, but is capable of numerous rearrangements, modifications and substitutions without departing from the spirit of the invention as set forth and defined by the following claims.

What is claimed is:

1. A switching apparatus capable of selectively coupling M external devices to a communication network, said switching apparatus comprising:
   an N×N output switching stage having N input interfaces and N output interfaces, wherein said N output interfaces are capable of being coupled to said communication network;
   a programmable M×N input switching stage having M input ports and N output ports, wherein M is greater than N, and wherein each of said M input ports is capable of being coupled to one of said M external devices and each of said N output ports is coupled to one of said N input interfaces of said N×N output switching stage; and a controller capable of controlling said programmable M×N input switching stage such that each one of said M external devices may be selectively coupled and decoupled to one of said N input interfaces of said N×N output switching stage according to a level of service associated with said each one of said M external devices.

2. The switching apparatus as set forth in claim 1 wherein said N×N output switching stage comprises an N×N asynchronous transfer mode (ATM) switch fabric.

3. The switching apparatus as set forth in claim 1 wherein said programmable M×N input switching stage comprises an M×N cross point switch.

4. The switching apparatus as set forth in claim 1 wherein said programmable M×N input switching stage comprises an M:N multiplexer having M input channels and N output channels.

5. A communication network comprising a plurality of switching apparatuses, each of said plurality of switching apparatuses capable of selectively coupling M external devices to internal network links of said communication network, wherein each of said plurality of switching apparatuses comprises:

an N×N output switching stage having N input interfaces and N output interfaces, wherein said N output interfaces are capable of being coupled to said internal network links of said communication network;

a programmable M×N input switching stage having M input ports and N output ports, wherein M is greater than N, and wherein each of said M input ports is capable of being coupled to one of said M external devices and each of said N output ports is coupled to one of said N input interfaces of said N×N output switching stage; and a controller capable of controlling said programmable M×N input switching stage such that each one of said M external devices may be selectively coupled and decoupled to one of said N input interfaces of said N×N output switching stage according to a level of service associated with said each one of said M external devices.

6. The communication network as set forth in claim 5 wherein said N×N output switching stage comprises an N×N asynchronous transfer mode (ATM) switch fabric.

7. The communication network as set forth in claim 5 wherein said programmable M×N input switching stage comprises an M×N cross point switch.

8. The communication network as set forth in claim 5 wherein said programmable M×N input switching stage comprises an M:N multiplexer having M input channels and N output channels.

9. A switching apparatus capable of selectively coupling M external devices to a communication network, said switching apparatus comprising:

an N×N output switching stage having N input interfaces and N output interfaces, wherein said N output interfaces are capable of being coupled to said communication network;

a programmable P×Q input switching stage having P input ports and Q output ports, wherein each of said P input ports is capable of being coupled to one of said M external devices and each of said Q output ports is coupled to one of said N input interfaces of said N×N output switching stage;

a programmable R×S input switching stage having R input ports and S output ports, wherein each of said R input ports is capable of being coupled to one of said M external devices and each of said S output ports is coupled to one of said N input interfaces of said N×N output switching stage, wherein at least one of said S output ports may be coupled to the same one of said N input interfaces of said N×N output switching stage as one of said Q outputs of said programmable P×Q input switching stage; and a controller capable of controlling said programmable P×Q input switching stage and said programmable R×S input switching stage such that each one of said M external devices may be selectively coupled and decoupled to one of said N input interfaces of said N×N output switching stage according to a level of service associated with said each one of said M external devices.

10. The switching apparatus as set forth in claim 9 wherein said N×N output switching stage comprises an N×N asynchronous transfer mode (ATM) switch fabric.

11. The switching apparatus as set forth in claim 9 wherein said programmable P×Q input switching stage comprises a P×Q cross point switch.

12. The switching apparatus as set forth in claim 9 wherein said programmable R×S input switching stage comprises an R×S cross point switch.

13. The switching apparatus as set forth in claim 9 wherein said programmable P×Q input switching stage comprises a P:Q multiplexer having P input channels and Q output channels.

14. The switching apparatus as set forth in claim 9 wherein said programmable R×S input switching stage comprises an R:S multiplexer having R input channels and S output channels.

15. A communication network comprising a plurality of switching apparatuses, each of said plurality of switching apparatuses capable of selectively coupling M external devices to internal network links of said communication network, wherein each of said plurality of switching apparatuses comprises:

an N×N output switching stage having N input interfaces and N output interfaces, wherein said N output interfaces are capable of being coupled to said communication network;

a programmable P×Q input switching stage having P input ports and Q output ports, wherein each of said P input ports is capable of being coupled to one of said M external devices and each of said Q output ports is coupled to one of said N input interfaces of said N×N output switching stage;

a programmable R×S input switching stage having R input ports and S output ports, wherein each of said R input ports is capable of being coupled to one of said M external devices and each of said S output ports is coupled to one of said N input interfaces of said N×N output switching stage, wherein at least one of said S output ports may be coupled to the same one of said N input interfaces of said N×N output switching stage as one of said Q outputs of said programmable P×Q input switching stage; and a controller capable of controlling said programmable P×Q input switching stage and said programmable R×S input switching stage such that each one of said M external devices may be selectively coupled and decoupled to one of said N input interfaces of said N×N output switching stage according to a level of service associated with said each one of said M external devices.

16. The communication network as set forth in claim 15 wherein said N×N output switching stage comprises an N×N asynchronous transfer mode (ATM) switch fabric.

17. The communication network as set forth in claim 15 wherein said programmable P×Q input switching stage comprises a P×Q cross point switch.

18. The communication network as set forth in claim 15 wherein said programmable R×S input switching stage comprises an R×S cross point switch.

19. The communication network as set forth in claim 15 wherein said programmable P×Q input switching stage comprises a P:Q multiplexer having P input channels and Q output channels.

20. The communication network as set forth in claim 15 wherein said programmable R×S input switching stage comprises an R:S multiplexer having R input channels and S output channels.

* * * * *